United States Patent
Olofsson

[19]
[11] Patent Number: 6,053,201
[45] Date of Patent: Apr. 25, 2000

[54] VALVE DEVICE

[75] Inventor: Hans Olofsson, Huddinge, Sweden

[73] Assignee: Alfa Laval Agri AB, Tumba, Sweden

[21] Appl. No.: 09/125,860
[22] PCT Filed: Feb. 25, 1997
[86] PCT No.: PCT/SE97/00320
§ 371 Date: Aug. 26, 1998
§ 102(e) Date: Aug. 26, 1998
[87] PCT Pub. No.: WO97/31209
PCT Pub. Date: Aug. 28, 1997

[30] Foreign Application Priority Data

Feb. 26, 1996 [SE] Sweden ................................. 9600722

[51] Int. Cl.$^7$ ................................................. F16K 31/00
[52] U.S. Cl. ..................... 137/595; 137/596; 137/627.5; 251/901
[58] Field of Search ..................... 251/901, 304, 251/902, 85, 88, 358, 309, 312; 137/595, 596, 627.5

[56] References Cited

U.S. PATENT DOCUMENTS

| | | | |
|---|---|---|---|
| 932,172 | 8/1909 | Porter et al. | 251/229 |
| 3,047,019 | 7/1962 | Simpson | 137/625.28 |
| 3,536,099 | 10/1970 | Erickson | 137/625.44 |
| 3,709,256 | 1/1973 | Gore et al. | 137/625.47 |
| 5,238,023 | 8/1993 | Kristoffer | 137/596.17 |

FOREIGN PATENT DOCUMENTS

| | | |
|---|---|---|
| 24 36 499 | 2/1976 | Germany. |
| 8201924 | 6/1982 | WIPO. |
| 9119123 | 12/1991 | WIPO. |

Primary Examiner—Henry J. Recla
Assistant Examiner—Peter deVore
Attorney, Agent, or Firm—Hovey, Williams, Timmons & Collins

[57] ABSTRACT

A valve device comprises a valve having an outlet passage (6, 7), a stationary surface, and a rotatable support member (15, 16) at a distance from the stationary surface, and a membrane (19) provided between the stationary surface and the support member. The membrane (19) is attached to the stationary surface and the support member in such a manner that when the rotatable support member is in a first rotating position in relation to the stationary surface the membrane covers an orifice (6, 7) associated with the outlet passage and located at the stationary surface and when the support member is in a second rotating position said opening is uncovered. The support member (15, 16) is provided rotatably about an axis (12) which in a plane, in which the axis (12) extend, forms an angle together with the generatrix of the stationary surface (10, 11).

14 Claims, 4 Drawing Sheets

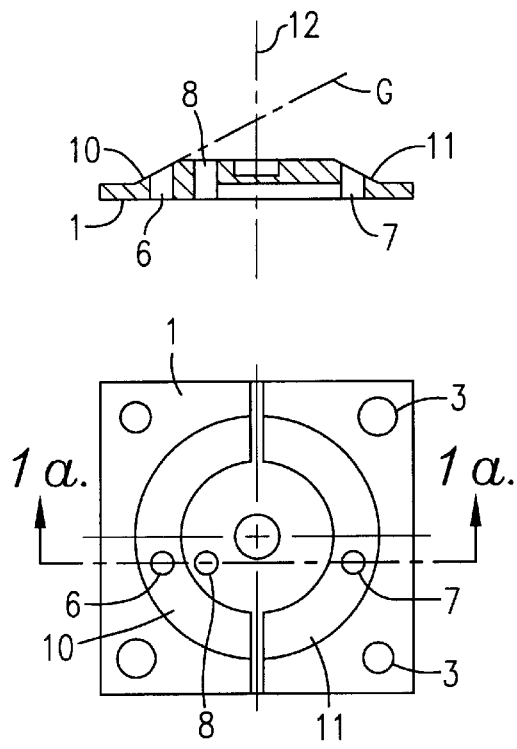
FIG. 1a.
FIG. 1b.
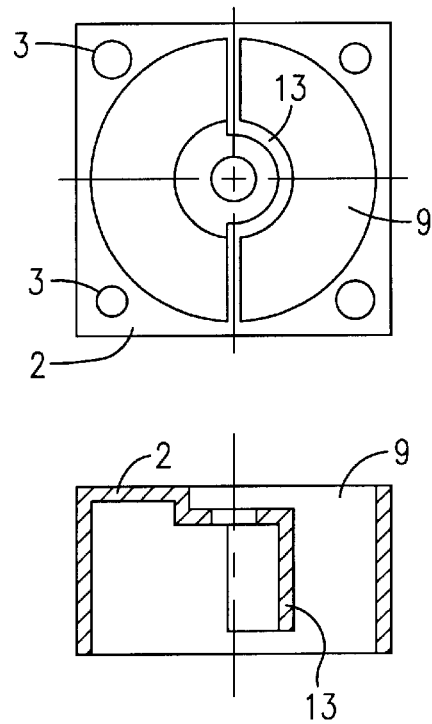
FIG. 2a.
FIG. 2b.
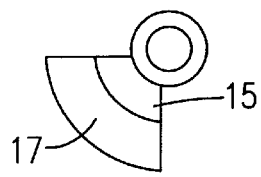
FIG. 3a.
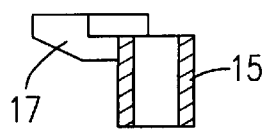
FIG. 3b.
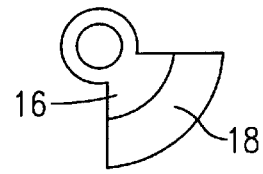
FIG. 4a.
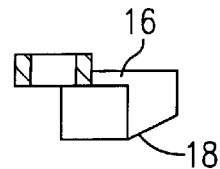
FIG. 4b.

FIG. 5a.
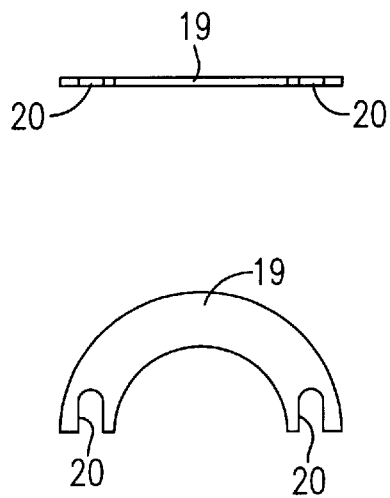
FIG. 5b.
FIG. 6.
FIG. 7a.
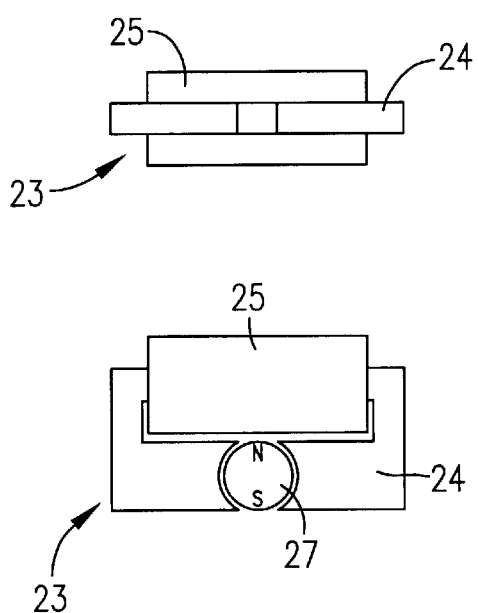
FIG. 7b.
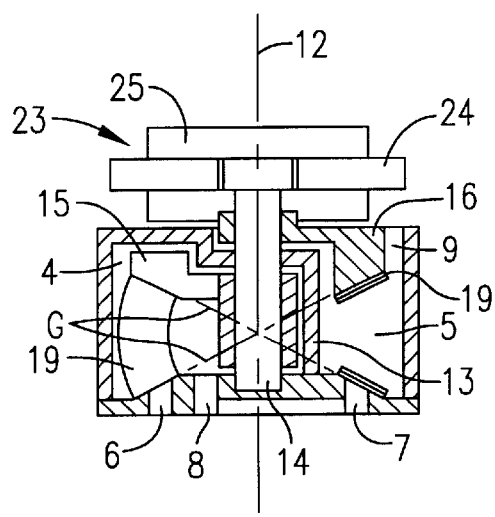
FIG. 8.

FIG. 9a.
FIG. 10a.
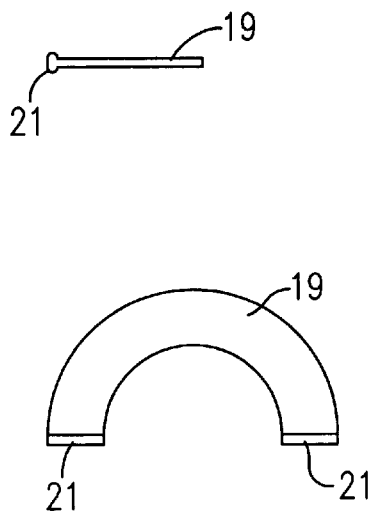
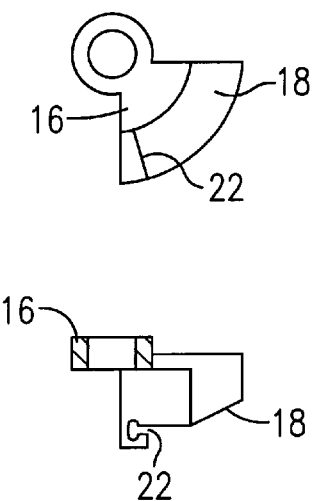
FIG. 9b.
FIG. 10b.
FIG. 11.
FIG. 12.
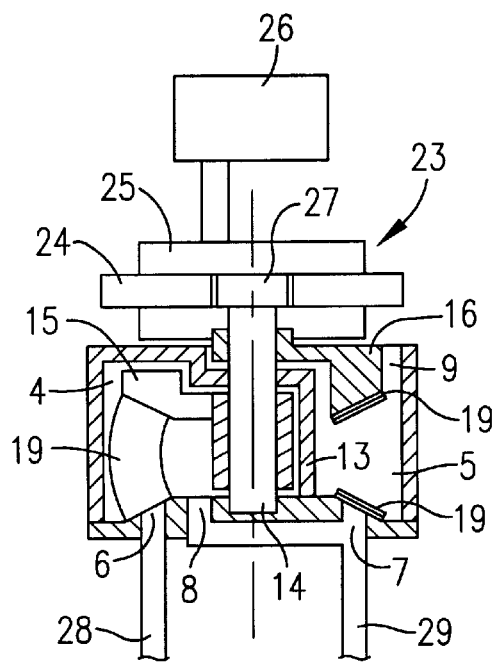

FIG.13a.
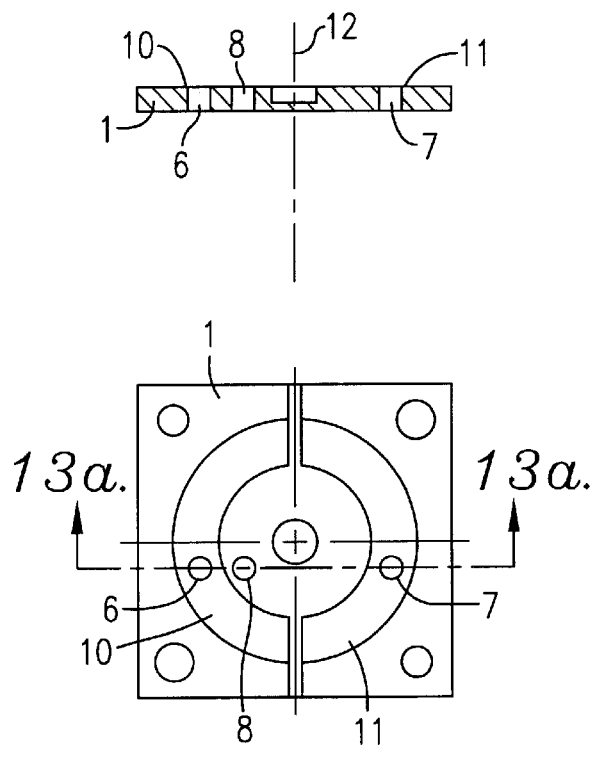
FIG.13b.
FIG.14a.
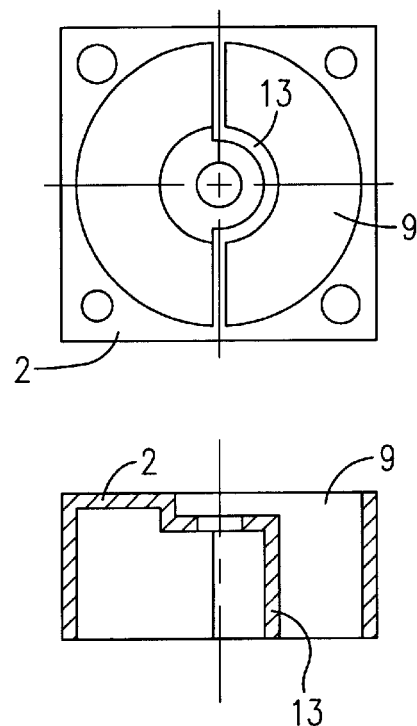
FIG.14b.
FIG.15a.
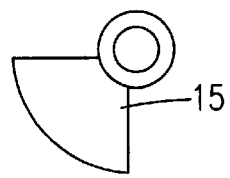
FIG.15b.
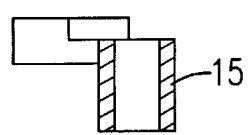
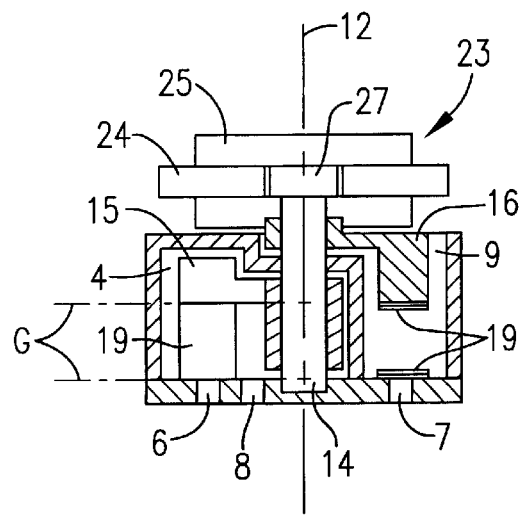
FIG.16.

VALVE DEVICE

BACKGROUND OF THE INVENTION

1. Field of the Invention

The present invention refers to a valve device comprising a valve having an outlet passage, a stationary surface, a support member provided at a distance from the stationary surface and rotatable about an axis, and a membrane provided between the stationary surface and the support member in such a manner that when the rotatable support member is in a first rotating position in relation to the stationary surface the membrane covers an orifice associated with the outlet passage and located at the stationary surface and when the support member is in a second rotating position said orifice is uncovered.

2. Description of the Prior Art

In many different fields magnet valves are used, for instance, as servo valves or control valves in different systems and arrangements working at high or low pressures, e.g. milking machines. Such magnet valves have the disadvantage that they are relatively heavy and large. Therefore, they require much space and may not be used on smaller arrangement components, especially not if these should be movable between different positions in a flexible and easy manner. Furthermore, such magnet valves are frequently energy requiring, partly due to the fact that the magnet requires continuous current supply in order to maintain at least one of the positions of the valve.

WO-A-8 201 924 discloses such a valve device initially defined and comprising a valve housing having an inlet passage and an outlet passage. The inner surface of the valve housing comprises an orifice associated with one of the passages and a rotatable support member is provided in the valve housing at a distance from the surface. Between the support member and the surface there is an elastic membrane provided in such a manner that when the rotatable support member is in a first rotating position in relation to the stationary surface the membrane covers the orifice and when the support member is in a second rotating position said orifice is uncovered. The rotatable support member comprises a longitudinal axis about which it is rotatable in relation to the surface and which is parallel to the surface. In most of the embodiments disclosed the membrane is formed by a closed band loop loosely, which is located between the surface and the support member and, which, due to the rotation of the support member, is rolling on the surface between a position over the orifice and a position beside the orifice. Consequently, the exact position of the membrane may be difficult to determine based on the rotating position of the support member. Moreover, this document discloses an embodiment in which the membrane is attached to a plane surface and to a displaceable pulling bar, the membrane being rolled over an outlet orifice provided at the plane surface by the displacement of the pulling bar from one end position to another.

EP-A-532 618 discloses a similar valve device initially defined and comprising a valve housing having an inlet passage and an outlet passage. In the valve housing, there are provided a stationary inner cylindrical envelope surface and a rotatable valve body at a distance from this surface. Between the inner cylindrical envelope surface and the valve body, there is a membrane provided in such a manner that when the valve body is in a first rotating position in relation to the cylindrical envelope surface the membrane covers an orifice associated with the outlet passage and located at the cylindrical envelope surface and that when the valve body is in a second rotating position said orifice is uncovered. Also according to this document, the longitudinal rotating axis of the valve body is parallel to the cylindrical envelope surface. In order to reduce the energy consumption, this document proposes the provision of a wing by means of which at least a part of the kinetic energy of the medium flowing through the valve may be recovered.

Due to the fact that the rotating axis of the valve body of these two known valve devices is parallel to the cylindrical envelope surface, the valve device becomes rather voluminous. Since the membrane has to have a certain length in order to be able to cover and uncover, respectively, completely the outlet orifice, the radius of the rotatable valve body has to exceed a determined value if the length of the rotating movement required should be limited to a quarter of a rotation, for instance. Consequently, the radius of the cylindrical envelope surface is given by the radius of the valve body plus said distance between the cylindrical envelope surface and the valve body, which in turn is determined by the thickness and the properties of the material used in the membrane.

SUMMARY OF THE INVENTION

The object of the present invention is to provide an improved valve device which is compact and which has a small energy requirement for its switch-over.

This object is obtained by the valve device initially mentioned and characterized in that the generatrix of the stationary surface forms an angle together with the axis in a plane in which both the generatrix and the axis extend. By positioning the rotating axis in this manner, i.e. that it in any plane comprising the rotating axis forms an angle, i.e. is not parallel, with the generatrix in this plane to the stationary surface, a very compact construction of the valve device is obtained. By this construction, the critical dimension becomes the distance between the support member and the stationary surface. This distance may be very short.

According to a first embodiment of the invention, the stationary surface is configured as at least a part of a circular, annular path having its center of rotation at said axis.

According to a further embodiment of the invention, the support member comprises a support surface facing the stationary surface. By such a support surface, against which the membrane may abut, a proper function of the membrane is ensured. Thereby, this support surface may advantageously be configured as at least a part of a circular, annular path having its center of rotation at said axis.

According to a further embodiment of the invention, the support surface and the stationary surface are essentially plane and parallel with each other. In this way, the smallest possible dimension of the valve device may be achieved, since the smallest possible distance between the support member and the stationary surface also will determine the distance between these elements. According to a variant of this embodiment of the invention, the support surface and the stationary surface are formed by two truncated conical surfaces facing each other, preferably by such a cone angle that their imaginary cone tips coincide at said axis.

According to a further embodiment of the invention, the membrane comprises a flexible material. Advantageously, this material is bent in a loop between the stationary surface and the support member in such a manner that a part of the loop covers the orifice in the first rotating position and that the loop uncovers the orifice in the second rotating position. Furthermore, the membrane may thereby comprise a first end attached to the support member and a second end attached to the stationary surface. Advantageously, each of the first and second ends comprises a thickened portion which is firmly held by means of a groove extending radially with respect to said axis at the stationary surface and the support member, respectively. By such an embodiment no further mounting elements, such as screws, rivets or the like, are needed and simultaneously the membrane is firmly fixed to the stationary surface and the support member, respectively, in a secure manner. The membrane may have a thickness of about 0.1–0.3 mm and said distance between the support member and the stationary surface may be about 2–8, preferably 4–6 mm.

According to a further embodiment of the invention, the valve comprises a valve housing, in which the stationary surface, the support member and the membrane are provided, and which comprises an inlet passage.

According to a further embodiment of the invention, the valve device comprises a driving member arranged to provide the rotation of the support member between the first and second rotating positions. By such a driving member, the valve device may advantageously be utilized as a control valve in different applications. The driving member may comprise a rotating magnet.

According to a further embodiment of the invention, the valve device comprises a further valve having an outlet passage, a stationary surface, a support member provided at a distance from the stationary surface and rotatable about said axis, and a membrane provided between the stationary surface and the support member in such a manner that when the support member is in a first rotating position in relation to the stationary surface the membrane covers an orifice associated with the outlet passage and located at the stationary surface, and when the support member is in a second rotating position said orifice is uncovered, said axis forming, in a plane through which said axis extends, an angle together with the generatrix of the stationary surface of the further valve. By such an embodiment, the valve device according to the invention may be utilized as a three-way valve having a very compact construction and functioning in a easily driven manner. Thereby, each of the stationary surfaces are configured as at least a part of a semicircular path having its centre of rotation at said axis, and the paths shaped as a semicircular ring are located essentially diametrically opposite to each other with respect to said axis.

BRIEF DESCRIPTION OF THE DRAWINGS

The present invention will now be explained more closely by means of different embodiments disclosed by way of example and with reference to the drawings attached hereto.

FIGS. 1a and 1b discloses a sectional side-view and a view from above of a bottom plate of a valve device according to a first embodiment of the invention.

FIGS. 2a and 2b discloses a view from beneath and a sectional side-view of a valve housing for the valve device according to the first embodiment.

FIGS. 3a and 3b discloses a view from beneath and a partly sectional sideview of a first rotating piston of the valve device according to the first embodiment.

FIGS. 4a and 4b discloses a view from beneath and a partly sectional sideview of a second rotating piston of the valve device according to the first embodiment.

FIGS. 5a and 5b discloses a side-view and a view from above of a membrane of the valve device according to the first embodiment.

FIGS. 6a and 6b discloses a side-view of a shaft member of the valve device according to the first embodiment.

FIGS. 7a and 7b discloses a side-view and a view from above of a driving member for the valve device according to the first embodiment.

FIG. 8 discloses a partly sectional side-view of the valve device according to the first embodiment.

FIGS. 9a and 9b discloses a side-view and a view from above of the membrane according to a second embodiment of the invention.

FIGS. 10a and 10b discloses a view from beneath and a partly sectional sideview of the second rotating piston according to the second embodiment.

FIGS. 11 and 12 disclose a partly sectional view of the valve device in FIG. 8 in two different rotating positions.

FIGS. 13a and 13b discloses a sectional side-view and a view from above of a bottom plate of a valve device according to the third embodiment of the invention.

FIGS. 14a and 14b discloses a view from beneath and sectional side-view of a valve housing for the valve device according to the third embodiment.

FIGS. 15a and 15b discloses a view from beneath and a partly sectional sideview of the first rotating piston of the valve device according to the third embodiment.

FIG. 16 discloses a partly sectional side-view of the valve device according to the third embodiment.

DETAILED DESCRIPTION OF DIFFERENT EMBODIMENTS

Firstly, it should be noted that components, which in the different embodiments have corresponding functions, have been given the same reference signs.

With reference to FIG. 1–12 a bottom plate 1, see especially FIGS. 1a and 1b, and a valve housing 2, see especially FIGS. 2a and 2b, are disclosed. The valve housing 2 is intended to be mounted, as is disclosed in FIG. 8, to the bottom plate 1 by means of screw bolts or the like (not disclosed), which extend through through holes 3 in the bottom plate 1 and valve housing 2. In this mounted state the valve housing 2 and the bottom plate 1 form, as is disclosed in FIG. 8, a first closed chamber 4, in which a first single-acting valve is provided, and a second chamber 5, in which a second single-acting valve is provided. The bottom plate 1 comprises a first outlet passage 6 for the first valve and a second outlet passage 7 for the second valve. Furthermore, the bottom plate comprises a first inlet passage 8 for the first valve whereas a second inlet passage 9 for the second valve is provided in the valve housing 2. The second inlet passage 9 is formed, in the example disclosed, by the circumstance that the valve housing 2 has no upper limiting wall for the second chamber 5. Furthermore, the bottom plate 1 comprises a first surface 10 located in the first chamber 4 and configured as an essentially semicircular path. Moreover, the bottom plate 1 comprises a second surface 11 located in the second chamber 5 and configured as an essentially semicircular path. The two semicircular paths 10, 11 have a common center of rotation 12 at the longitudinal axis of the valve device. The first outlet passage 6 has an orifice at the first path 10 and the second outlet passage 7 has an orifice at the second path 11. It should be noted, that the valve housing 2 comprises an intermediate wall 13 by means of which the two chambers 4, 5 are separated from each other. In the direction of the longitudinal axis 12, a shaft member 14 extends, see FIGS. 6 and 8, which is rotatably supported in the bottom plate 1. The shaft member 14 carries a first support member or a first rotating piston 15 which is located in the first chamber 4, and a second support member or a second rotating piston 16, which is located in the second chamber 5, see especially FIGS. 3, 4 and 8. Each of the first rotating piston 15 and the second rotating piston 16 comprises a semicircular path 17 and 18, respectively, which extends over about a quarter of a rotation and which has a center of rotation coinciding with the longitudinal axis 12 in the mounted state of the valve device. In the mounted state the first and the second rotating pistons 15, 16 are fixedly mounted to the shaft member 14 in such a manner that they, seen in the direction of the longitudinal axis 12, are diametrically opposite to each other and mirror-symmetrically provided with regard to a plane extending between the rotating pistons and comprising the longitudinal axis 12. Consequently, the shaft member 14 and the rotating pistons 15, 16 are configured in such a manner that they may be rotated a quarter of a rotation between two stable end positions, at which the rotating pistons 15, 16 abut the intermediate wall 13.

Between the first rotating piston 15 and the first path 10, and the second rotating piston 16 and the second path 11, respectively, a membrane 19, see FIG. 5, is provided. Each membrane 19 is attached to the path 17 and 18, respectively, of the rotating pistons 15 and 16 with a first end and with a second end to the path 10 and 11, respectively, of the bottom plate 1. The membrane 19 is manufactured in any flexible, elastic material, preferably any plastic material, for instance polyurethane. The membrane 19 may have a thickness of about 0.1–0.3 mm, e.g. about 0.2 mm. It is also possible to manufacture the membrane 19 in any other material, for instance spring steel or any similar metal material, which also may be very thin. The membranes 19 may be attached to the rotating pistons 15, 16 and the bottom plate 1, respectively, in different manners, for instance by glueing, riveting or by means of screws not disclosed and screwed into the paths in such a manner that these screws are engaging recesses 20 provided at the ends of the membrane 19, see FIGS. 2a and 5b. According to a second embodiment the membrane 19, as is disclosed in FIGS. 9a and 9b and FIGS. 10a and 10b, may also be provided with a thickened portion or bead 21 at their both ends, and this thickened portion may be introduced laterally in a recess 22 which is provided in a shoulder projecting from the paths 10, 11, 17, 18, and which extends in parallel to said paths and radially outwardly from the longitudinal axis 12. Such a recess 22 is merely disclosed for the second rotating piston 18 in FIGS. 10a and 10b. The recess 22 is configured in such a manner that the opening extending across the path 18 is thinner than the largest width of the recess 22, which is located further down in the recess 22.

FIGS. 7a and 7b discloses a driving member 23 arranged to provide the rotation of the shaft member 14 between the two stable end positions. The driving member 23 comprises an iron core 24 having a winding 25 connected to a current source (not disclosed) of a schematically disclosed control device 26, see FIGS. 11 and 12, and a magnet 27 being fixedly provided on the shaft member 14. Consequently, the shaft member 14 and the two rotating pistons 15, 16 may be displaced between the two end positions by means of a short current pulse through the winding 25, which is generated by the control device 26.

In the mounted state of the valve device each membrane 19 is bent in a U-shaped loop. One leg of the U-shaped loop will abut the surface 17, 18 of the rotating piston 15, 16 and the other leg of the loop will abut the path 10, 11 of the bottom plate 1. Thereby, the curved portion of the U-shaped loop has such a radius of curvature that the distance between the opposite paths 10, and 17 and 18, respectively, is about 2–8, preferably 4–6 mm. When the shaft member 14 and thus the two rotating pistons 15, 16 are rotated, the membrane 19 will be displaced along the path 10, 11 and 17, 18 by a partly rolling movement. In a first such stable end position, the membrane 19 located in the chamber 4 will be positioned above the outlet orifice 6 and thus cover this orifice whereas the membrane 19 located in the chamber 5 will be positioned laterally of the outlet passage 7 in such a manner that this passage is uncovered for medium passage therethrough. In the second stable end position, in which the shaft member 14 has been rotated a quarter of a rotation in relation to the first end position, the membrane 19 located in the first chamber 4 will uncover the outlet passage 6 whereas the membrane 19 located in the second chamber 5 covers the outlet passage 7. This second end position, in which the second outlet passage 7 is closed, is illustrated in FIG. 11 and the first end position, in which the first of the outlet passage 6 is closed, is illustrated in FIG. 12.

As is disclosed in FIGS. 1a and 1b, FIGS. 3a and 3b, FIGS. 4a and 4b and FIG. 8, the paths 10, 11 and 17, 18, respectively, form truncated conical surfaces and are facing each other in such a manner that the imaginary tips of the conical surfaces coincide at the longitudinal axis 12, which is illustrated by dotted lines G in FIG. 8. According to a third embodiment, disclosed in FIGS. 13a and 13b, FIGS. 14a and 14b, FIGS. 15a and 15b and FIG. 16, the paths 10, 11, 17, 18 may instead be essentially plane and parallel to each other. By such an embodiment, the valve device may be still further compact since the smallest possible radius of curvature of the U-shaped membrane 19 determines the distance between the paths 10 and 17, and 11 and 18, respectively. Furthermore, it should be noted that the paths 10, 11, 17, 18, in the section disclosed in FIG. 8 and 16, also may have a convex or concave shape. As is clear from FIGS. 8, 11 and 12, the axis 12, in the plane disclosed in these figures, forms an angle together with the generatrix G of the paths 10, 11, 17, 18, which if it is rectilinearly extended also intersects the axis 12. Of course, this is the case also for the third embodiment and FIG. 16 discloses that a rectilinear continuation of the generatrix G of the paths 10, 11, 17, 18 intersects perpendicularly the axis 12.

The valve device disclosed may be utilized in very many different areas of applications. It may function as control or pilot valve in plants or systems operating at relatively high pressures, i.e. above atmospheric pressure, as well as at relatively low pressure, i.e. below atmospheric pressure. Besides applications concerning air or other gases, it may also be utilized in applications concerning liquids.

By means of the expressions "inlet passage" and "outlet passage" used in the present application the direction of a medium flowing through the valve housing 2 is designated, i.e. the medium flows into the valve housing 2 through the inlet passage 8, 9 and out from the valve housing 2 through the outlet passage 6, 7. Consequently, in a possible low pressure application a "vacuum" will propagate in the reversed direction, i.e. in through the outlet passage 6, 7 and out through the inlet passage 8,9.

In FIGS. 11 and 12, a conduit 28 is disclosed, which for instance may be connected to a vacuum pump and a conduit 29 which is connected to a device, for instance in connection with a milking arrangement, to which device a vacuum and an atmospheric pressure is to be applied in an alternating manner. Thus, in the second end position disclosed in FIG. 11, the medium will flow through the conduit 29 in through the first inlet passage 8 and out through the first outlet passage 6 and the conduit 28. Since the valves are single-acting, the pressure prevailing in the second chamber 5 has to be higher than the one prevailing in the conduit 29. In the first rotating position disclosed in FIG. 12, the connection between the conduit 28 and 29 is closed by means of the membrane 19 in the first chamber 4 and medium may flow in through the second inlet passage 9 and out through the conduit 29.

The present invention is not limited to the embodiments disclosed herein but may be varied and modified within the scope of the subsequent claims. Although the valve device have been described above in connection with a three-way valve, it ought to be clear to the person skilled in the art that it also may be utilized in applications of a single-acting two-way valve.

I claim:

1. A valve device comprising a valve having:
   an outlet passage;
   a stationary surface presenting a generatrix and configured as at least a part of a circular, annular path having its center of rotation at an axis;
   a support member provided at a distance from the stationary surface and rotatable about said axis; and
   a membrane of flexible material provided between the stationary surface and the support member in such a manner that when the rotatable support member is in a first rotating position in relation to a stationary surface, the membrane covers an orifice associated with the outlet passage and is located at the stationary surface, and when the support member is in a second rotating position said orifice is uncovered, wherein the generatrix of the stationary surface forms an angle together with the axis in a plane in which both the generatrix and the axis extend, and wherein the flexible material is bent in a loop between the stationary surface and the support member in such a manner that a part of the loop covers the orifice in the first rotating position and that the loop uncovers the orifice in the second rotating position.

2. A valve device according to claim 1, wherein the support member comprises a support surface facing the stationary surface.

3. A valve device according to claim 2, wherein the support surface is configured as at least a part of a circular, annular path having a center of rotation at said axis.

4. A valve device according to claim 2, wherein the support surface and the stationary surface are essentially plane and parallel with each other.

5. A valve device according to claim 1, wherein the support member has a support surface and the support surface and the stationary surface are formed by two truncated conical surfaces facing each other each projecting respective imaginary cone tips which coincide at said axis.

6. A valve device according to claim 1, wherein the membrane comprises a first end attached to the support member and a second end attached to the stationary surface.

7. A valve device according to claim 6, wherein each of the first and second ends comprises a thickened portion which is firmly held by means of a groove extending radially with respect to said axis at the stationary surface and the support member, respectively.

8. A valve device according to claim 1, wherein the membrane has a thickness of about 0.1–0.3 mm.

9. A valve device according to claim 1, wherein the said distance between the support member and stationary surface is about 2–8 mm.

10. A valve device according to claim 1, wherein the valve comprises a valve housing, in which the stationary surface, the support member and the membrane are provided, and which comprises an inlet passage.

11. A valve device according to claim 1, including a driving member arranged to provide the rotation of the support member between the first and second rotating positions.

12. A valve device according to claim 11, wherein the driving member comprises a rotating magnet.

13. A valve device according to claim 1, comprising a further valve having an outlet passage, a stationary surface presently a generatrix, a support member provided at a distance from the stationary surface and rotatable about said axis, and a membrane provided between the stationary surface and the support member in such a manner that when the support member is in a first rotating position in relation to the stationary surface the membrane covers an orifice associated with the outlet passage and located at the stationary surface, and when the support member is in a second rotating position said orifice is uncovered, and that said axis forms, in a plane through which said axis extends, an angle together with the generatrix of the stationary surface of the further valve.

14. A valve device according to claim 13, wherein each of the stationary surfaces are configured as at least a part of respective semicircular paths having common centers of rotation at said axis, and that the paths shaped as a semicircular ring are located essentially diametrically opposite to each other with respect to said axis.

* * * * *